(12) United States Patent
Chui et al.

(10) Patent No.: US 12,002,149 B2
(45) Date of Patent: Jun. 4, 2024

(54) MACHINE LEARNING BASED IMAGE ATTRIBUTE DETERMINATION

(71) Applicant: Outward, Inc., San Jose, CA (US)

(72) Inventors: Clarence Chui, Los Altos Hills, CA (US); Manu Parmar, Sunnyvale, CA (US)

(73) Assignee: Outward, Inc., San Jose, CA (US)

( * ) Notice: Subject to any disclaimer, the term of this patent is extended or adjusted under 35 U.S.C. 154(b) by 175 days.

(21) Appl. No.: 17/540,173

(22) Filed: Dec. 1, 2021

(65) Prior Publication Data

US 2022/0092848 A1 Mar. 24, 2022

Related U.S. Application Data

(63) Continuation of application No. 16/523,888, filed on Jul. 26, 2019, now Pat. No. 11,232,627, which is a continuation-in-part of application No. 16/181,607, filed on Nov. 6, 2018, now Pat. No. 11,024,076, which is a continuation of application No. 15/721,426, filed on Sep. 29, 2017, now Pat. No. 10,163,250, which is a continuation-in-part of
(Continued)

(51) Int. Cl.
G06K 9/36 (2006.01)
G06F 16/58 (2019.01)
G06T 5/50 (2006.01)
G06T 7/32 (2017.01)
G06T 15/20 (2011.01)

(52) U.S. Cl.
CPC ............ *G06T 15/205* (2013.01); *G06F 16/58* (2019.01); *G06T 5/50* (2013.01); *G06T 7/32* (2017.01)

(58) Field of Classification Search
CPC ... G06T 15/205; G06T 7/0051; G06T 7/0065; G06T 7/0077; G06T 7/0075; G06T 5/005; G06T 2207/10028; G06T 2207/10024; G06T 3/4038; G06T 11/60; H04N 1/3876; H04N 5/23238; G06K 2009/2045
USPC ................................................. 382/154, 284
See application file for complete search history.

(56) References Cited

U.S. PATENT DOCUMENTS 6,222,947 B1 4/2001 Koba
6,377,257 B1 4/2002 Borrel
(Continued)

FOREIGN PATENT DOCUMENTS

CN 101281640 6/2012
CN 203870604 10/2014
(Continued)

OTHER PUBLICATIONS

Bouwmans et al.: "Deep neural network concepts for background subtraction: A systematic review and comparative evaluation", Neural Networks, Elsevier Science Publishers, Barking, GB, vol. 117, May 15, 2019 (May 15, 2019), pp. 8-66.
(Continued)

*Primary Examiner* — Duy M Dang
(74) *Attorney, Agent, or Firm* — Van Pelt, Yi & James LLP

(57) ABSTRACT

Techniques for machine learning based image attribute determination are disclosed. In some embodiments, one or more unknown attributes of a received image comprising a prescribed environment are determined using a machine learning based framework. The machine learning based framework is at least in part trained on image data sets comprising a model environment that substantially simulates the prescribed environment.

54 Claims, 8 Drawing Sheets

Related U.S. Application Data application No. 15/081,553, filed on Mar. 25, 2016, now Pat. No. 9,996,914.

(60) Provisional application No. 62/541,607, filed on Aug. 4, 2017.

(56) References Cited

U.S. PATENT DOCUMENTS

| | | |
|---|---|---|
| 8,655,052 B2 | 2/2014 | Spooner |
| 9,407,904 B2 | 8/2016 | Sandrew |
| 10,909,749 B2 | 2/2021 | Chui |
| 2005/0018045 A1 | 1/2005 | Thomas |
| 2006/0280368 A1 | 12/2006 | Petrich |
| 2008/0143715 A1 | 6/2008 | Moden |
| 2009/0028403 A1 | 1/2009 | Bar-Aviv |
| 2011/0001826 A1 | 1/2011 | Hongo |
| 2012/0120240 A1 | 5/2012 | Muramatsu |
| 2012/0140027 A1 | 6/2012 | Curtis |
| 2012/0163672 A1 | 6/2012 | Mckinnon |
| 2012/0314937 A1 | 12/2012 | Kim |
| 2013/0100290 A1 | 4/2013 | Sato |
| 2013/0259448 A1 | 10/2013 | Stankiewicz |
| 2014/0198182 A1 | 7/2014 | Ward |
| 2014/0254908 A1 | 9/2014 | Strommer |
| 2014/0267343 A1 | 9/2014 | Arcas |
| 2015/0169982 A1 | 6/2015 | Perry |
| 2015/0317822 A1 | 11/2015 | Haimovitch-Yogev |
| 2017/0103512 A1 | 4/2017 | Mailhe |
| 2017/0278251 A1 | 9/2017 | Peeper |
| 2017/0304732 A1 | 10/2017 | Velic |
| 2017/0334066 A1 | 11/2017 | Levine |
| 2017/0372193 A1 | 12/2017 | Mailhe |
| 2018/0012330 A1 | 1/2018 | Holzer |
| 2019/0325621 A1 | 10/2019 | Wang |

FOREIGN PATENT DOCUMENTS

| | | |
|---|---|---|
| JP | 2000137815 | 5/2000 |
| JP | 2003187261 | 7/2003 |
| JP | 2004287517 | 10/2004 |
| JP | 2009211335 | 9/2009 |
| JP | 2010140097 | 6/2010 |
| JP | 2017212593 | 11/2017 |
| JP | 2018081672 | 5/2018 |
| KR | 20060029140 | 4/2006 |
| KR | 20120137295 | 12/2012 |
| KR | 20140021766 | 2/2014 |
| KR | 20190094254 | 8/2019 |
| WO | 2018197984 | 11/2018 |
| WO | 2019167453 | 9/2019 |

OTHER PUBLICATIONS

Ledig et al., "Photo-Realistic Single Image Super-Resolution Using a Generative Adversarial Network", Sep. 15, 2016 (Sep. 15, 2016), Retrieved from the Internet: URL:https://arxiv.org/pdf/1609.04802.pdf.

Stamatios Lefkimmiatis: "Non-local Color Image Denoising with Convolutional Neural Networks", IEEE Conference on Computer Vision and Pattern Recognition (CVPR 2017), Jul. 1, 2017 (Jul. 1, 2017), pp. 5882-5891, ISBN: 978-1-5386-0457-1, Retrieved from the Internet: URL: https://arxiv.org/pdf/1611.06757.pdf>.

Daniel Scharstein. "A Survey of Image-Based Rendering and Stereo". In: "View Synthesis Using Stereo Vision", Lecture Notes in Computer Science, vol. 1583, Jan. 1, 1999, pp. 23-39.

Inamoto et al. "Virtual Viewpoint Replay for a Soccer Match by View Interpolation from Multiple Cameras". IEEE Transactions on Multimedia, vol. 9 No. 6, Oct. 1, 2007, pp. 1155-1166.

Sun et al. "An overview of free viewpoint Depth-Image-Based Rendering (DIBR)." Proceedings of the Second APSIPA Annual Summit and Conference. Dec. 14, 2010, pp. 1-8.

MACHINE LEARNING BASED IMAGE ATTRIBUTE DETERMINATION

CROSS REFERENCE TO OTHER APPLICATIONS

This application is a continuation of U.S. patent application Ser. No. 16/523,888, now U.S. Pat. No. 11,232,627, entitled ARBITRARY VIEW GENERATION filed Jul. 26, 2019, which is a continuation-in-part of U.S. patent application Ser. No. 16/181,607, now U.S. Pat. No. 11,024,076, entitled ARBITRARY VIEW GENERATION filed Nov. 6, 2018, which is a continuation of U.S. patent application Ser. No. 15/721,426, now U.S. Pat. No. 10,163,250, entitled ARBITRARY VIEW GENERATION filed Sep. 29, 2017, which claims priority to U.S. Provisional Patent Application No. 62/541,607 entitled FAST RENDERING OF ASSEMBLED SCENES filed Aug. 4, 2017 and which is a continuation-in-part of U.S. patent application Ser. No. 15/081,553, now U.S. Pat. No. 9,996,914, entitled ARBITRARY VIEW GENERATION filed Mar. 25, 2016, all of which are incorporated herein by reference for all purposes.

BACKGROUND OF THE INVENTION

Existing rendering techniques face a trade-off between competing objectives of quality and speed. A high quality rendering requires significant processing resources and time. However, slow rendering techniques are not acceptable in many applications, such as interactive, real-time applications. Lower quality but faster rendering techniques are typically favored for such applications. For example, rasterization is commonly employed by real-time graphics applications for relatively fast renderings but at the expense of quality. Thus, improved techniques that do not significantly compromise either quality or speed are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for generating an arbitrary view of a scene are disclosed. The paradigm described herein entails very low processing or computational overhead while still providing a high definition output, effectively eliminating the challenging trade-off between rendering speed and quality. The disclosed techniques are especially useful for very quickly generating a high quality output with respect to interactive, real time graphics applications. Such applications rely on substantially immediately presenting a preferably high quality output in response to and in accordance with user manipulations of a presented interactive view or scene.

Figure 1:
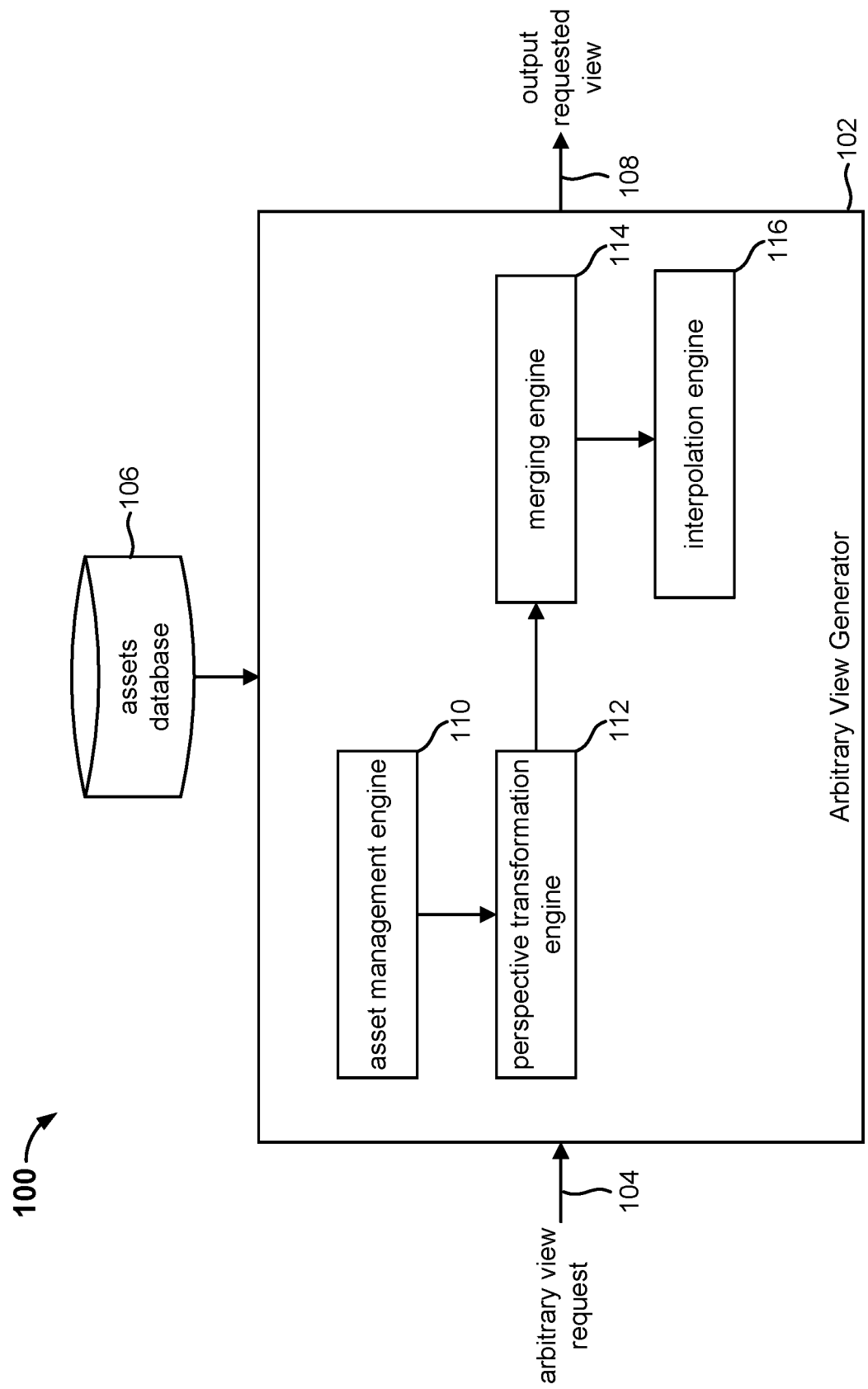
FIG. 1 is a high level block diagram illustrating an embodiment of a system for generating an arbitrary view of a scene.

FIG. 1 is a high level block diagram illustrating an embodiment of a system 100 for generating an arbitrary view of a scene. As depicted, arbitrary view generator 102 receives a request for an arbitrary view as input 104, generates the requested view based on existing database assets 106, and provides the generated view as output 108 in response to the input request. In various embodiments, arbitrary view generator 102 may comprise a processor such as a central processing unit (CPU) or a graphical processing unit (GPU). The depicted configuration of system 100 in FIG. 1 is provided for the purposes of explanation. Generally, system 100 may comprise any other appropriate number and/or configuration of interconnected components that provide the described functionality. For example, in other embodiments, arbitrary view generator 102 may comprise a different configuration of internal components 110-116, arbitrary view generator 102 may comprise a plurality of parallel physical and/or virtual processors, database 106 may comprise a plurality of networked databases or a cloud of assets, etc.

Arbitrary view request 104 comprises a request for an arbitrary perspective of a scene. In some embodiments, the requested perspective of the scene does not already exist in an assets database 106 that includes other perspectives or viewpoints of the scene. In various embodiments, arbitrary view request 104 may be received from a process or a user. For example, input 104 may be received from a user interface in response to user manipulation of a presented scene or portion thereof, such as user manipulation of the camera viewpoint of a presented scene. As another example, arbitrary view request 104 may be received in response to a specification of a path of movement or travel within a virtual environment, such as a fly-through of a scene. In some embodiments, possible arbitrary views of a scene that may be requested are at least in part constrained. For example, a user may not be able to manipulate the camera viewpoint of a presented interactive scene to any random position but rather is constrained to certain positions or perspectives of the scene.

Database 106 stores a plurality of views of each stored asset. In the given context, an asset refers to a specific scene whose specification is stored in database 106 as a plurality of views. In various embodiments, a scene may comprise a single object, a plurality of objects, or a rich virtual environment. Specifically, database 106 stores a plurality of images corresponding to different perspectives or viewpoints of each asset. The images stored in database 106 comprise high quality photographs or photorealistic renderings. Such high definition, high resolution images that populate database 106 may be captured or rendered during offline processes or obtained from external sources. In some embodiments, corresponding camera characteristics are stored with each image stored in database 106. That is, camera attributes such as relative location or position, orientation, rotation, depth information, focal length, aperture, zoom level, etc., are stored with each image. Furthermore, camera lighting information such as shutter speed and exposure may also be stored with each image stored in database 106.

Figure 2:
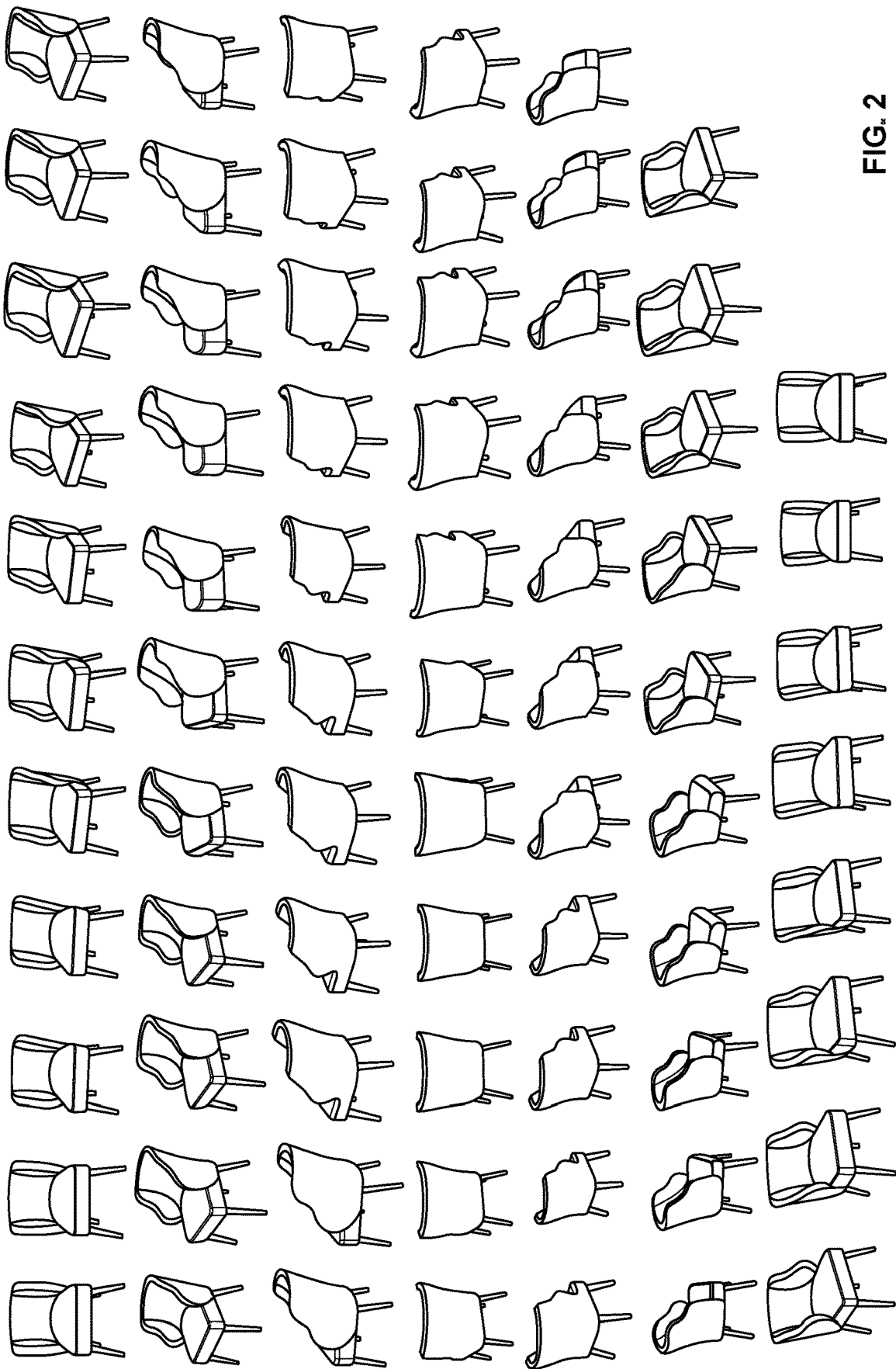
FIG. 2 illustrates an example of a database asset.

In various embodiments, any number of different perspectives of an asset may be stored in database 106. FIG. 2 illustrates an example of a database asset. In the given example, seventy-three views corresponding to different angles around a chair object are captured or rendered and stored in database 106. The views may be captured, for example, by rotating a camera around the chair or rotating the chair in front of a camera. Relative object and camera location and orientation information is stored with each generated image. FIG. 2 specifically illustrates views of a scene comprising a single object. Database 106 may also store a specification of a scene comprising a plurality of objects or a rich virtual environment. In such cases, multiple views corresponding to different locations or positions in a scene or three-dimensional space are captured or rendered and stored along with corresponding camera information in database 106. Generally, images stored in database 106 may comprise two or three dimensions and may comprise stills or frames of an animation or video sequence.

In response to a request for an arbitrary view of a scene 104 that does not already exist in database 106, arbitrary view generator 102 generates the requested arbitrary view from a plurality of other existing views of the scene stored in database 106. In the example configuration of FIG. 1, asset management engine 110 of arbitrary view generator 102 manages database 106. For example, asset management engine 110 may facilitate storage and retrieval of data in database 106. In response to a request for an arbitrary view of a scene 104, asset management engine 110 identifies and obtains a plurality of other existing views of the scene from database 106. In some embodiments, asset management engine 110 retrieves all existing views of the scene from database 106. Alternatively, asset management engine 110 may select and retrieve a subset of the existing views, e.g., that are closest to the requested arbitrary view. In such cases, asset management engine 110 is configured to intelligently select a subset of existing views from which pixels may be harvested to generate the requested arbitrary view. In various embodiments, multiple existing views may be retrieved by asset management engine 110 together or as and when they are needed by other components of arbitrary view generator 102.

The perspective of each existing view retrieved by asset management engine 110 is transformed into the perspective of the requested arbitrary view by perspective transformation engine 112 of arbitrary view generator 102. As previously described, precise camera information is known and stored with each image stored in database 106. Thus, a perspective change from an existing view to the requested arbitrary view comprises a simple geometric mapping or transformation. In various embodiments, perspective transformation engine 112 may employ any one or more appropriate mathematical techniques to transform the perspective of an existing view into the perspective of an arbitrary view. In the cases in which the requested view comprises an arbitrary view that is not identical to any existing view, the transformation of an existing view into the perspective of the arbitrary view will comprise at least some unmapped or missing pixels, i.e., at angles or positions introduced in the arbitrary view that are not present in the existing view.

Pixel information from a single perspective-transformed existing view will not be able to populate all pixels of a different view. However, in many cases, most, if not all, pixels comprising a requested arbitrary view may be harvested from a plurality of perspective-transformed existing views. Merging engine 114 of arbitrary view generator 102 combines pixels from a plurality of perspective-transformed existing views to generate the requested arbitrary view. Ideally, all pixels comprising the arbitrary view are harvested from existing views. This may be possible, for example, if a sufficiently diverse set of existing views or perspectives of the asset under consideration is available and/or if the requested perspective is not too dissimilar from the existing perspectives.

Any appropriate techniques may be employed to combine or merge pixels from a plurality of perspective-transformed existing views to generate the requested arbitrary view. In one embodiment, a first existing view that is closest to the requested arbitrary view is selected and retrieved from database 106 and transformed into the perspective of the requested arbitrary view. Pixels are then harvested from this perspective-transformed first existing view and used to populate corresponding pixels in the requested arbitrary view. In order to populate pixels of the requested arbitrary view that were not available from the first existing view, a second existing view that includes at least some of these remaining pixels is selected and retrieved from database 106 and transformed into the perspective of the requested arbitrary view. Pixels that were not available from the first existing view are then harvested from this perspective-transformed second existing view and used to populate corresponding pixels in the requested arbitrary view. This process may be repeated for any number of additional existing views until all pixels of the requested arbitrary view have been populated and/or until all existing views have been exhausted or a prescribed threshold number of existing views have already been used.

In some embodiments, a requested arbitrary view may include some pixels that are not available from any existing views. In such cases, interpolation engine 116 is configured to populate any remaining pixels of the requested arbitrary view. In various embodiments, any one or more appropriate interpolation techniques may be employed by interpolation engine 116 to generate these unpopulated pixels in the requested arbitrary view. Examples of interpolation techniques that may be employed include, for instance, linear interpolation, nearest neighbor interpolation, etc. Interpolation of pixels introduces averaging or smoothing. Overall image quality may not be significantly affected by some interpolation, but excessive interpolation may introduce unacceptable blurriness. Thus, interpolation may be desired to be sparingly used. As previously described, interpolation is completely avoided if all pixels of the requested arbitrary view can be obtained from existing views. However, interpolation is introduced if the requested arbitrary view includes some pixels that are not available from any existing views. Generally, the amount of interpolation needed depends on the number of existing views available, the diversity of perspectives of the existing views, and/or how different the perspective of the arbitrary view is in relation to the perspectives of the existing views.

With respect to the example depicted in FIG. 2, seventy-three views around a chair object are stored as existing views of the chair. An arbitrary view around the chair object that is different or unique from any of the stored views may be generated using a plurality of these existing views, with preferably minimal, if any, interpolation. However, generating and storing such an exhaustive set of existing views may not be efficient or desirable. In some cases, a significantly smaller number of existing views covering a sufficiently diverse set of perspectives may instead be generated and stored. For example, the seventy-three views of the chair object may be decimated into a small set of a handful of views around the chair object.

As previously mentioned, in some embodiments, possible arbitrary views that may be requested may at least in part be constrained. For example, a user may be restricted from moving a virtual camera associated with an interactive scene to certain positions. With respect to the given example of FIG. 2, possible arbitrary views that may be requested may be limited to arbitrary positions around the chair object but may not, for example, include arbitrary positions under the chair object since insufficient pixel data exists for the bottom of the chair object. Such constraints on allowed arbitrary views ensure that a requested arbitrary view can be generated from existing data by arbitrary view generator 102.

Arbitrary view generator 102 generates and outputs the requested arbitrary view 108 in response to input arbitrary view request 104. The resolution or quality of the generated arbitrary view 108 is the same as or similar to the qualities of the existing views used to generate it since pixels from those views are used to generate the arbitrary view. Thus, using high definition existing views in most cases results in a high definition output. In some embodiments, the generated arbitrary view 108 is stored in database 106 with other existing views of the associated scene and may subsequently be employed to generate other arbitrary views of the scene in response to future requests for arbitrary views. In the cases in which input 104 comprises a request for an existing view in database 106, the requested view does not need to be generated from other views as described; instead, the requested view is retrieved via a simple database lookup and directly presented as output 108.

Arbitrary view generator 102 may furthermore be configured to generate an arbitrary ensemble view using the described techniques. That is, input 104 may comprise a request to combine a plurality of objects into a single custom view. In such cases, the aforementioned techniques are performed for each of the plurality of objects and combined to generate a single consolidated or ensemble view comprising the plurality of objects. Specifically, existing views of each of the plurality of objects are selected and retrieved from database 106 by asset management engine 110, the existing views are transformed into the perspective of the requested view by perspective transformation engine 112, pixels from the perspective-transformed existing views are used to populate corresponding pixels of the requested ensemble view by merging engine 114, and any remaining unpopulated pixels in the ensemble view are interpolated by interpolation engine 116. In some embodiments, the requested ensemble view may comprise a perspective that already exists for one or more objects comprising the ensemble. In such cases, the existing view of an object asset corresponding to the requested perspective is employed to directly populate pixels corresponding to the object in the ensemble view instead of first generating the requested perspective from other existing views of the object.

As an example of an arbitrary ensemble view comprising a plurality of objects, consider the chair object of FIG. 2 and an independently photographed or rendered table object. The chair object and the table object may be combined using the disclosed techniques to generate a single ensemble view of both objects. Thus, using the disclosed techniques, independently captured or rendered images or views of each of a plurality of objects can be consistently combined to generate a scene comprising the plurality of objects and having a desired perspective. As previously described, depth information of each existing view is known. The perspective transformation of each existing view includes a depth transformation, allowing the plurality of objects to be appropriately positioned relative to one another in the ensemble view.

Generating an arbitrary ensemble view is not limited to combining a plurality of single objects into a custom view. Rather, a plurality of scenes having multiple objects or a plurality of rich virtual environments may be similarly combined into a custom ensemble view. For example, a plurality of separately and independently generated virtual environments, possibly from different content generation sources and possibly having different existing individual perspectives, may be combined into an ensemble view having a desired perspective. Thus, generally, arbitrary view generator 102 may be configured to consistently combine or reconcile a plurality of independent assets comprising possibly different existing views into an ensemble view having a desired, possibly arbitrary perspective. A perfectly harmonious resulting ensemble view is generated since all combined assets are normalized to the same perspective. The possible arbitrary perspectives of the ensemble view may be constrained based on the existing views of the individual assets available to generate the ensemble view.

Figure 3:
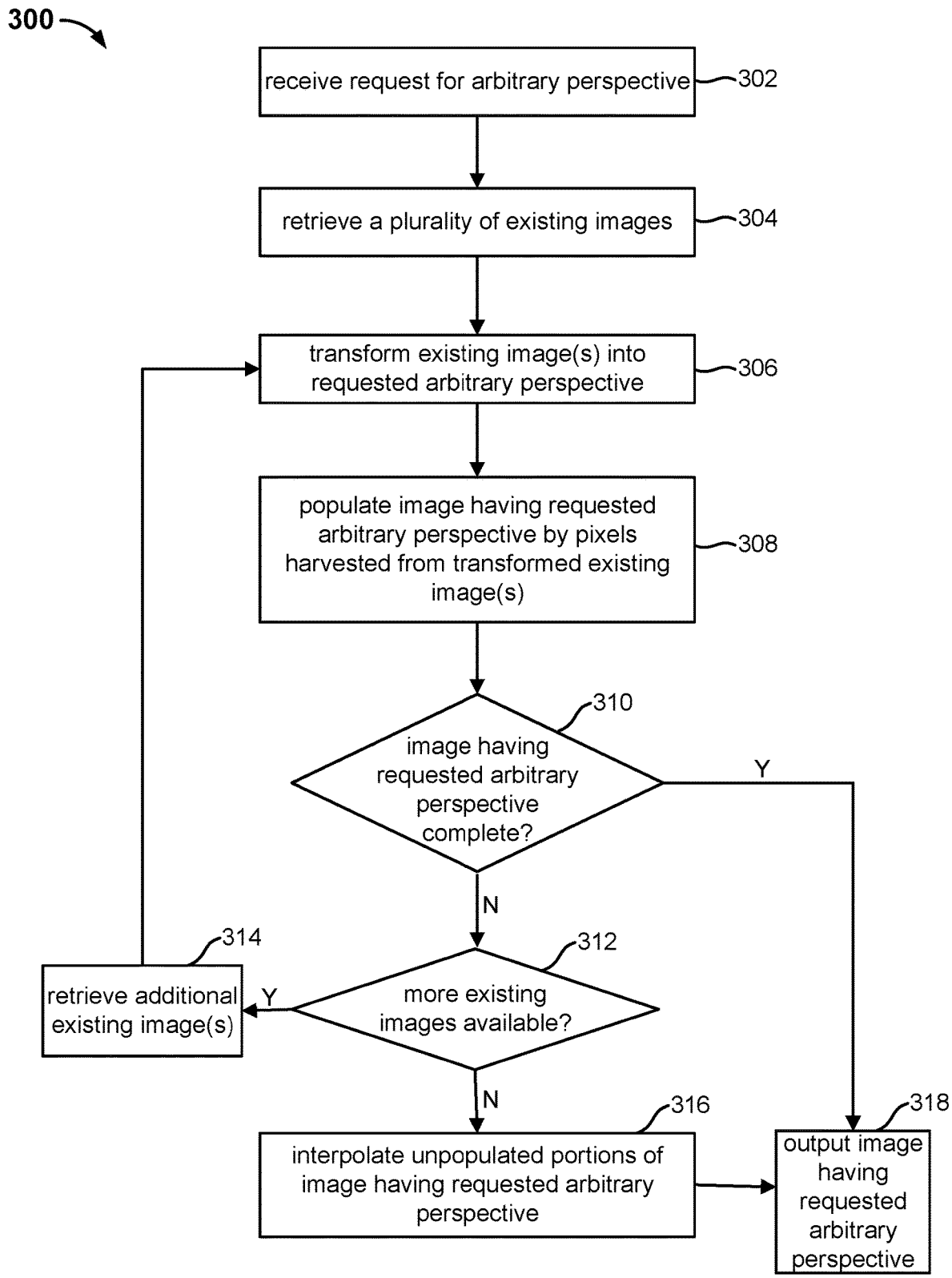
FIG. 3 is a flow chart illustrating an embodiment of a process for generating an arbitrary perspective.

FIG. 3 is a flow chart illustrating an embodiment of a process for generating an arbitrary perspective. Process 300 may be employed, for example, by arbitrary view generator 102 of FIG. 1. In various embodiments, process 300 may be employed to generate an arbitrary view of a prescribed asset or an arbitrary ensemble view.

Process 300 starts at step 302 at which a request for an arbitrary perspective is received. In some embodiments, the request received at step 302 may comprise a request for an arbitrary perspective of a prescribed scene that is different from any existing available perspectives of the scene. In such cases, for example, the arbitrary perspective request may be received in response to a requested change in perspective of a presented view of the scene. Such a change in perspective may be facilitated by changing or manipulating a virtual camera associated with the scene, such as by panning the camera, changing the focal length, changing the zoom level, etc. Alternatively, in some embodiments, the request received at step 302 may comprise a request for an arbitrary ensemble view. As one example, such an arbitrary ensemble view request may be received with respect to an application that allows a plurality of independent objects to be selected and provides a consolidated, perspective-corrected ensemble view of the selected objects.

At step 304, a plurality of existing images from which to generate at least a portion of the requested arbitrary perspective is retrieved from one or more associated assets databases. The plurality of retrieved images may be associated with a prescribed asset in the cases in which the request received at step 302 comprises a request for an arbitrary perspective of a prescribed asset or may be associated with a plurality of assets in the cases in which the request received at step 302 comprises a request for an arbitrary ensemble view.

At step 306, each of the plurality of existing images retrieved at step 304 that has a different perspective is transformed into the arbitrary perspective requested at step 302. Each of the existing images retrieved at step 304 includes associated perspective information. The perspective of each image is defined by the camera characteristics associated with generating that image such as relative position, orientation, rotation, angle, depth, focal length, aperture, zoom level, lighting information, etc. Since complete camera information is known for each image, the perspective transformation of step 306 comprises a simple mathematical operation. In some embodiments, step 306 also optionally includes a lighting transformation so that all images are consistently normalized to the same desired lighting conditions.

At step 308, at least a portion of an image having the arbitrary perspective requested at step 302 is populated by pixels harvested from the perspective-transformed existing images. That is, pixels from a plurality of perspective-corrected existing images are employed to generate an image having the requested arbitrary perspective.

At step 310, it is determined whether the generated image having the requested arbitrary perspective is complete. If it is determined at step 310 that the generated image having the requested arbitrary perspective is not complete, it is determined at step 312 whether any more existing images are available from which any remaining unpopulated pixels of the generated image may be mined. If it is determined at step 312 that more existing images are available, one or more additional existing images are retrieved at step 314, and process 300 continues at step 306.

If it is determined at step 310 that the generated image having the requested arbitrary perspective is not complete and if it is determined at step 312 that no more existing images are available, any remaining unpopulated pixels of the generated image are interpolated at step 316. Any one or more appropriate interpolation techniques may be employed at step 316.

If it is determined at step 310 that the generated image having the requested arbitrary perspective is complete or after interpolating any remaining unpopulated pixels at step 316, the generated image having the requested arbitrary perspective is output at step 318. Process 300 subsequently ends.

As described, the disclosed techniques may be used to generate an arbitrary perspective based on other existing perspectives. Normalizing different existing perspectives into a common, desired perspective is possible since camera information is preserved with each existing perspective. A resulting image having the desired perspective can be constructed from mining pixels from perspective-transformed existing images. The processing associated with generating an arbitrary perspective using the disclosed techniques is not only fast and nearly instantaneous but also results in a high quality output, making the disclosed techniques particularly powerful for interactive, real-time graphics applications.

The aforementioned techniques comprise a uniquely efficient paradigm for generating a desired arbitrary view or perspective of a scene using existing reference views or images having perspectives that are different from the desired perspective. More specifically, the disclosed techniques facilitate the quick generation of a high definition image having a desired arbitrary perspective from one or more existing reference images from which most, if not all, pixels of the desired arbitrary perspective are harvested. As described, the existing reference images comprise high quality photographs or photorealistic renderings and may be captured or rendered during offline processes or obtained from external sources. Furthermore, (virtual) camera characteristics are stored as metadata with each reference image and may later be employed to facilitate perspective transformations of the image. Various techniques for generating reference images, such as the images or views stored in assets database 106 of FIG. 1, as well as further specifics on their associated metadata are next described.

Figure 4:
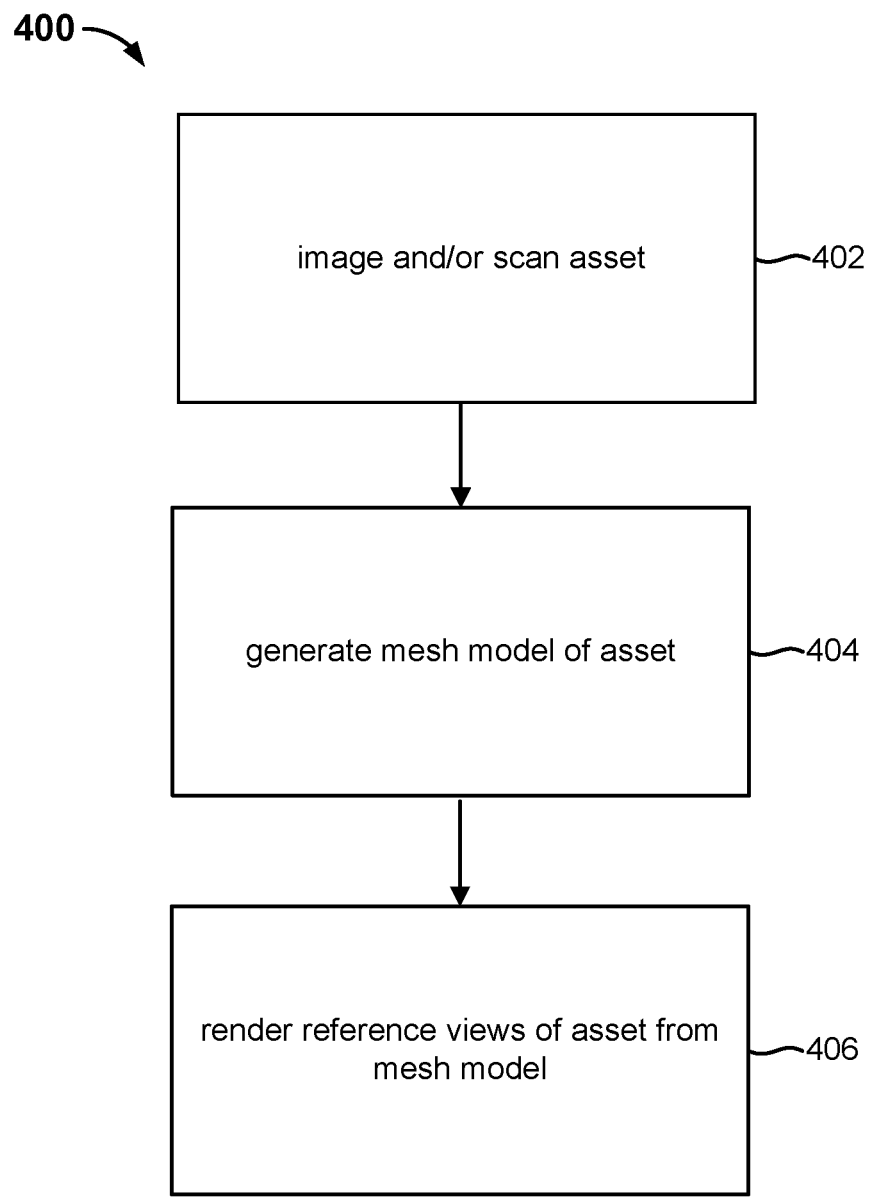
FIG. 4 is a flow chart illustrating an embodiment of a process for generating reference images or views of an asset from which an arbitrary view of the asset may be generated.

FIG. 4 is a flow chart illustrating an embodiment of a process for generating reference images or views of an asset from which an arbitrary view or perspective of the asset may be generated. In some embodiments, process 400 is employed to generate the reference images or views of an asset stored in database 106 of FIG. 1. Process 400 may comprise an offline process.

Process 400 starts at step 402 at which an asset is imaged and/or scanned. A plurality of views or perspectives of an asset are captured at step 402, for instance, by rotating an imaging or scanning device around the asset or rotating an asset in front of such a device. In some cases, an imaging device such as a camera may be employed to capture high quality photographs of the asset at step 402. In some cases, a scanning device such as a 3D scanner may be employed to collect point cloud data associated with the asset at step 402. Step 402 furthermore includes capturing applicable metadata with image and/or scan data, such as camera attributes, relative location or position, depth information, lighting information, surface normal vectors, etc. Some of these metadata parameters may be estimated. For instance, normal data may be estimated from depth data. In some embodiments, at least a prescribed set of perspectives of an asset are captured at step 402 that cover most, if not all, areas or surfaces of interest of the asset. Moreover, different imaging or scanning devices having different characteristics or attributes may be employed at step 402 for different perspectives of a given asset and/or for different assets stored in database 106.

At step 404, a three-dimensional polygon mesh model of the asset is generated from the image and/or scan data captured at step 402. That is, a fully reconciled three-dimensional mesh model is generated based on the photographs and/or point cloud data as well as associated metadata captured at step 402. In some embodiments, just enough asset data is captured at step 402 to ensure that a complete mesh model can be built at step 404. Portions of the generated mesh model that were not sufficiently captured at step 402 may be interpolated. In some cases, step 404 is not completely automated but entails at least some human intervention to ensure that the generated three-dimensional mesh model is well-ordered.

At step 406, a plurality of reference images or views of an asset are rendered from the three-dimensional mesh model generated at step 404. Any appropriate rendering technique may be employed at step 406 depending on available resources. For example, simpler rendering techniques such as scanline rendering or rasterization may be employed when constraints exist with respect to computational resources and/or render time, although at the expense of render quality. In some cases, more complex rendering techniques such as ray tracing may be employed that consume more resources but produce high quality, photorealistic images. Each reference image rendered at step 406 comprises relevant metadata that is determined from the three-dimensional mesh model and may include parameters such as (virtual) camera attributes, relative location or position, depth information, lighting information, surface normal vectors, etc.

In some embodiments, any source images captured at step 402 comprise a very small subset of the reference images or views of an asset stored in database 106. Rather, most of the images or views of an asset stored in database 106 are rendered using the three-dimensional mesh model of the asset generated at step 404. In some embodiments, the reference images or views of an asset comprise one or more orthographic views of the asset. Such orthographic views of a plurality of different assets may be combined (e.g., stacked together or placed side-by-side like building blocks) to generate an orthographic view of a composite asset built from or by combining a plurality of independently captured or rendered individual assets that can then be collectively transformed into any arbitrary camera perspective by transforming the orthographic views of each of the individual assets into the desired arbitrary perspective.

The three-dimensional mesh model based rendering of process 400 of FIG. 4 is computationally intensive and time consuming. Thus, in most cases, process 400 comprises an offline process. Moreover, although a three-dimensional mesh model of an asset may exist, rendering a high quality arbitrary perspective directly from such a model is not efficiently achievable for many applications including most real-time or on-demand applications. Rather, more efficient techniques need to be employed to satisfy speed constraints despite the existence of an underlying three-dimensional mesh model from which any arbitrary desired perspective of an asset may be rendered. For example, the arbitrary view generation techniques described with respect to the description of FIGS. 1-3 may be employed to very quickly generate a desired arbitrary view or perspective based on existing reference views or images of the asset while still maintaining a quality that is comparable to the quality of the reference views. In some embodiments, however, the inefficiencies associated with the steps of building the three-dimensional mesh model and rendering reference views from the model might not be desirable or acceptable despite having the option of performing these steps offline. In some such cases, the steps of building a mesh model and employing complex rendering techniques for generating reference views may be eliminated as further described next.

Figure 5:
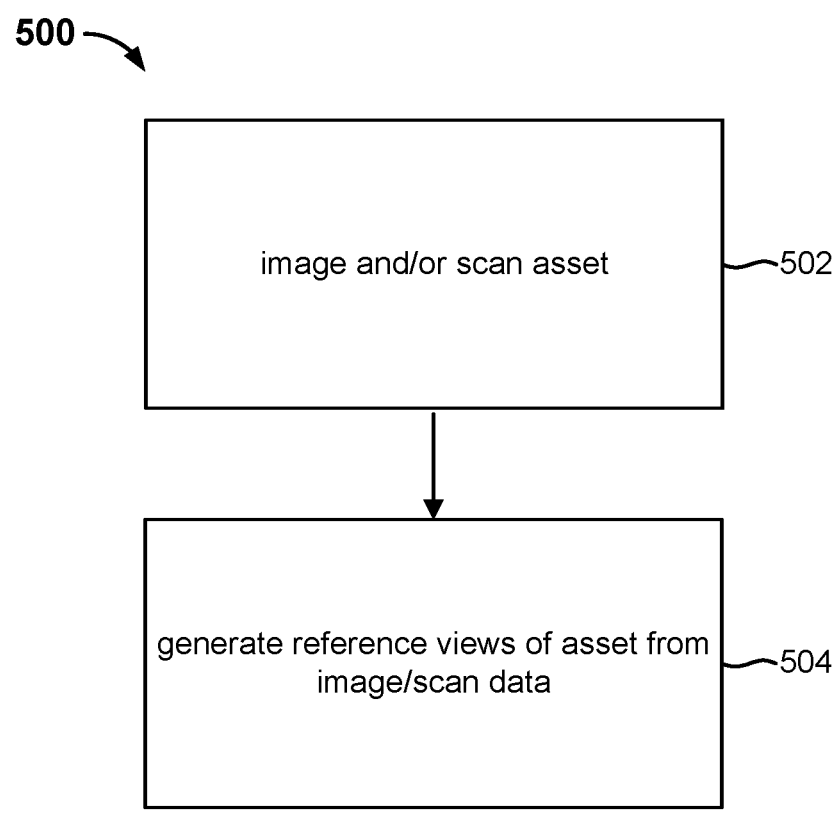
FIG. 5 is a flow chart illustrating an embodiment of a process for generating reference images or views of an asset from which an arbitrary view of the asset may be generated.

FIG. 5 is a flow chart illustrating an embodiment of a process for generating reference images or views of an asset from which an arbitrary view or perspective of the asset may be generated. In some embodiments, process 500 is employed to generate the reference images or views of an asset stored in database 106 of FIG. 1. Process 500 may comprise an offline process.

Process 500 starts at step 502 at which an asset is imaged and/or scanned. A plurality of views or perspectives of an asset are captured at step 502, for instance, by rotating an imaging or scanning device around the asset or rotating an asset in front of such a device. The views captured at step 502 may at least in part comprise orthographic views of the asset. In some embodiments, an image/scan captured at step 502 has an overlapping field of view with at least one other image/scan captured at step 502, and the relative (camera/scanner) pose between the two is known and stored. In some cases, an imaging device such as a DSLR (digital single-lens reflex) camera may be employed to capture high quality photographs of the asset at step 502. For example, a camera with a long lens may be employed to simulate orthographic views. In some cases, a scanning device such as a 3D scanner may be employed to collect point cloud data associated with the asset at step 502. Step 502 furthermore includes storing applicable metadata with image and/or scan data, such as camera attributes, relative location or position, lighting information, surface normal vectors, relative pose between images/scans having overlapping fields of view, etc. Some of these metadata parameters may be estimated. For instance, normal data may be estimated from depth data. In some embodiments, at least a prescribed set of perspectives of an asset are captured at step 502 that sufficiently cover most, if not all, areas or surfaces of interest of the asset. Moreover, different imaging or scanning devices having different characteristics or attributes may be employed at step 502 for different perspectives of a given asset and/or for different assets stored in database 106.

At step 504, a plurality of reference images or views of the asset are generated based on the data captured at step 502. Reference views are generated at step 504 simply from the images/scans and associated metadata captured at step 502. That is, with the appropriate metadata and overlapping perspectives captured at step 502, any arbitrary view or perspective of the asset may be generated. In some embodiments, an exhaustive set of reference views of an asset that are stored in database 106 are generated from the images/scans captured at step 502 and their associated metadata. The data captured at step 502 may be sufficient to form fragments of a mesh model, but a unified, fully-reconciled mesh model need not be generated. Thus, a complete three-dimensional mesh model of the asset is never generated nor are complex rendering techniques such as ray tracing employed to render reference images from the mesh model. Process 500 provides improved efficiency by eliminating the steps of process 400 that consume the most processing resources and time.

The reference images generated at step 504 may facilitate faster generation of arbitrary views or perspectives using the techniques described with respect to the description of FIGS. 1-3. However, in some embodiments, a repository of reference images need not be generated at step 504. Rather the views captured at step 502 and their associated metadata are sufficient to generate any desired arbitrary view of the asset using the techniques described with respect to the description of FIGS. 1-3. That is, any desired arbitrary view or perspective may be generated simply from a small set of high quality images/scans with overlapping fields of view that capture most, if not all, areas or surfaces of an asset and that are registered with relevant metadata. The processing associated with generating a desired arbitrary view from just the source images captured at step 502 is fast enough for many on-demand, real-time applications. However, if further efficiency in speed is desired, a repository of reference views may be generated such as at step 504 of process 500.

As described, each image or view of an asset in database 106 may be stored with corresponding metadata. Metadata may be generated from a three-dimensional mesh model when rendering a view from the model, when imaging or scanning the asset (in which case depth and/or surface normal data may be estimated), or a combination of both.

A prescribed view or image of an asset comprises pixel intensity values (e.g., RGB values) for each pixel comprising the image as well as various metadata parameters associated with each pixel. In some embodiments, one or more of the red, green, and blue (RGB) channels or values of a pixel may be employed to encode the pixel metadata. The pixel metadata, for example, may include information about the relative location or position (e.g., x, y, and z coordinate values) of the point in three-dimensional space that projects at that pixel. Furthermore, the pixel metadata may include information about surface normal vectors (e.g., angles made with the x, y, and z axes) at that position. Moreover, the pixel metadata may include texture mapping coordinates (e.g., u and v coordinate values). In such cases, an actual pixel value at a point is determined by reading the RGB values at the corresponding coordinates in a texture image.

The surface normal vectors facilitate modifying or varying the lighting of a generated arbitrary view or scene. More specifically, re-lighting a scene comprises scaling pixel values based on how well the surface normal vectors of the pixels match the direction of a newly added, removed, or otherwise altered light source, which may at least in part be quantified, for example, by the dot product of the light direction and normal vectors of the pixels. Specifying pixel values via texture mapping coordinates facilitates modifying or varying the texture of a generated arbitrary view or scene or part thereof. More specifically, the texture can be changed by simply swapping or replacing a referenced texture image with another texture image having the same dimensions.

As described, references images or views of an asset may be generated with or without an underlying mesh model of the asset. In the most efficient embodiments, simply a small set of source images/scans that capture various (overlapping) views around an asset and their associated relevant metadata are needed to generate any desired arbitrary view of the asset and/or a set of reference views from which a desired arbitrary view may be generated using the techniques described with respect to the description of FIGS. 1-3. In such embodiments, the most resource intensive steps of modeling and path tracing based rendering are eliminated. The images or views generated using the disclosed arbitrary view generation techniques may comprise static or dynamic scenes and may comprise stills or frames of an animation or video sequence. In the cases of motion capture, a set of images or views of one or more assets may be generated for each time slice. The disclosed techniques are especially useful in applications demanding the quick generation of high quality arbitrary views, such as gaming applications, virtual/alternative reality applications, CGI (computer-generated imagery) applications, etc.

Existing three-dimensional content frameworks that are based on rendering from three-dimensional models are typically developed and optimized for specific uses and lack scalability for different platforms and applications. As a result, substantial effort and resources need to be invested and replicated in generating the same three-dimensional content for different use cases. Moreover, requirements for three-dimensional content face moving targets over time. Thus, three-dimensional content needs to be manually re-generated with changing requirements. The difficulty in standardizing three-dimensional content formats across different platforms, devices, applications, use cases, and generally various quality requirements has thus far resulted in thwarting the proliferation of three-dimensional content. Therefore, a more scalable format for representing three-dimensional content that may be employed to deliver any desired quality level as disclosed herein is needed.

The disclosed techniques comprise a fundamentally novel framework for representing three-dimensional content as two-dimensional content while still providing all of the attributes of traditional three-dimensional frameworks as well as various other features and advantages. As previously described, three-dimensional content and corresponding information is encoded into a plurality of images from which any desired arbitrary view may be generated without requiring an underlying three-dimensional model of the associated asset. That is, the aforementioned techniques effectively comprise the transformation of three-dimensional source content into two-dimensional content, i.e., images. More specifically, the disclosed techniques result in a two-dimensional platform comprising a set of images associated with an asset that effectively replaces traditional three-dimensional platforms comprising three-dimensional models. As previously described, images comprising the two-dimensional platform may be generated from three-dimensional models and/or from a small set of source images or scans. Relevant metadata is stored with respect to each view of an asset and, in some cases, encoded as pixel values. The image-based views and metadata of the given two-dimensional architecture facilitate employing two-dimensional content as a three-dimensional source. Thus, the disclosed techniques completely displace traditional three-dimensional architectures that rely on rendering using underlying three-dimensional polygon mesh models. Three-dimensional source content such as a physical asset or a three-dimensional mesh model of the asset is encoded or transformed into a two-dimensional format comprising a set of views and metadata that is instead employed to represent and provide the features that have traditionally been only available via three-dimensional frameworks including the ability to generate a plurality of different views or perspectives of the asset. In addition to providing all of the features of traditional three-dimensional frameworks, the disclosed two-dimensional representation provides various additional inherent features including being amenable to traditional image processing techniques.

In the disclosed two-dimensional framework for representing three-dimensional content, information about an asset is encoded as image data. An image comprises an array having height, width, and a third dimension comprising pixel values. Images associated with an asset may comprise various reference views or perspective of the asset and/or corresponding metadata encoded as pixel values, e.g., as RGB channel values. Such metadata may include, for instance, camera characteristics, textures, uv coordinate values, xyz coordinate values, surface normal vectors, lighting information such as global illumination values or values associated with a prescribed lighting model, etc. In various embodiments, images comprising reference views or perspectives of an asset may be (high quality) photographs or (photorealistic) renderings.

Various features are supported by the disclosed two-dimensional framework including the ability to render desired arbitrary views or perspectives of assets having, for example, arbitrary camera characteristics (including camera position and lens type), arbitrary asset ensembles or combinations, arbitrary lighting, arbitrary texture variations, etc. Since complete camera information is known for and stored with reference views of an asset, other novel views of the asset comprising arbitrary camera characteristics may be generated from a plurality of perspective transformed reference views of the asset. More specifically, a prescribed arbitrary view or perspective of a single object or scene may be generated from a plurality of existing reference images associated with the object or scene while a prescribed arbitrary ensemble view may be generated by normalizing and consistently combining a plurality of objects or scenes into a consolidated view from sets of reference images associated with the objects or scenes. Reference views of assets may have lighting modeled by one or more lighting models such as a global illumination model. Surface normal vectors known for the reference views facilitate arbitrary lighting control including the ability to re-light an image or scene according to any desired lighting model. Reference views of assets may have textures specified via texture mapping (uv) coordinates which facilitate arbitrary texture control by allowing any desired textures to be substituted by simply changing referenced texture images.

As described, the disclosed two-dimensional framework is based on image datasets and consequently amenable to image processing techniques. Thus, the disclosed image-based two-dimensional framework for representing three-dimensional content is inherently seamlessly scalable and resource adaptive both up and down the computation and bandwidth spectrums. Existing techniques for scaling images such as image compression techniques may be advantageously employed to scale the image-based three-dimensional content of the disclosed framework. Images comprising the disclosed two-dimensional framework may be easily scaled in terms of quality or resolution to appropriately conform to the requirements of different channels, platforms, devices, applications, and/or use cases. Image quality or resolution requirements may vary significantly for different platforms such as mobile versus desktop, different models of devices of a given platform, different applications such as online viewers versus native applications running locally on machines, over time, different network bandwidths, etc. Thus, there exists a need for an architecture such as the disclosed two-dimensional framework that comprehensively satisfies the requirements of different use cases and is immune to changes in requirements over time.

Generally, the disclosed two-dimensional framework supports resource adaptive rendering. Furthermore, time variant quality/resolution adaptation may be provided based on the current or real time availability of computational resources and/or network bandwidth. Scaling, i.e., providing the ability to smoothly and seamlessly degrade or upgrade image quality level, is in most cases completely automated. For instance, the disclosed two-dimensional framework provides the ability to automatically downsample an asset (i.e., one or more images comprising the asset) across one or more features including reference views or perspectives as well as images encoding metadata (e.g., textures, surface normal vectors, xyz coordinates, uv coordinates, lighting values, etc.) without requiring manual intervention. In some such cases, the scaling of an asset may not be uniform across all features of the asset but may be varied depending on the type of information comprising or encoded in an image associated with the asset. For example, actual image pixel values of reference views or perspectives of an asset may be compressed in a lossy manner, but images encoding certain metadata such as depth (i.e., xyz values) and normal values may not be compressed in the same manner or, in some cases, at all since loss in such information may not be acceptable when rendering.

In some embodiments, a master asset (i.e., a set of images comprising the master asset) having the highest available quality or resolution is generated and stored, e.g., in database 106 of FIG. 1. In some such cases, one or more lower quality/resolution versions of the asset are automatically generated from the master asset and stored so that an appropriate version can be selected to generate a requested perspective or view based on the (current) capabilities of the server generating the requested perspective, the requesting client, and/or one or more associated communication networks. Alternatively, in some cases, a single version of an asset, i.e., the master asset, is stored, and the disclosed framework supports streaming or progressive delivery of a quality or resolution up to that of the master asset based on the (current) capabilities of the server generating the requested perspective, the requesting client, and/or one or more associated communication networks.

Figure 6:
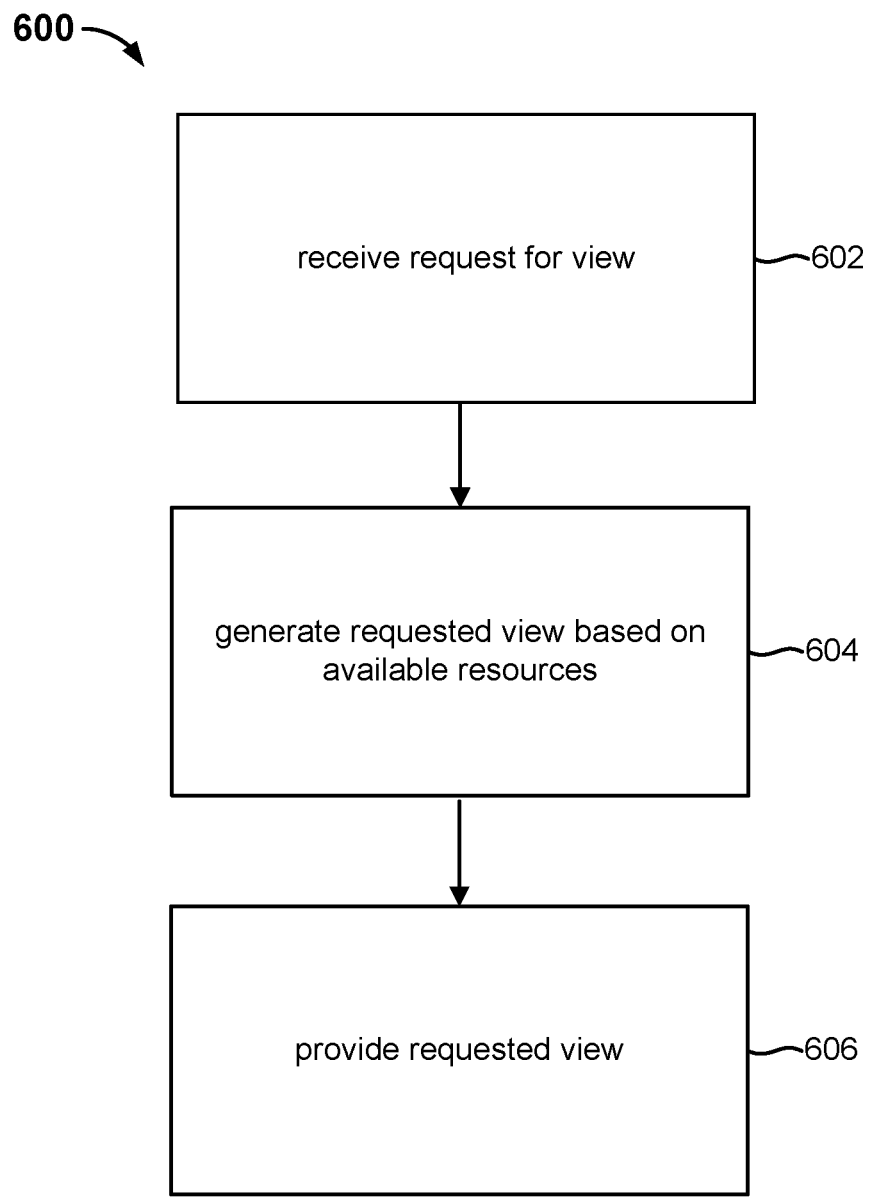
FIG. 6 is a flow chart illustrating an embodiment of a process for providing a requested view of a scene.

FIG. 6 is a flow chart illustrating an embodiment of a process for providing a requested view of a scene. Process 600 may be employed, for example, by arbitrary view generator 102 of FIG. 1. In some embodiments, process 300 of FIG. 3 is a part of process 600. In various embodiments, process 600 may be employed to generate an arbitrary view of a scene comprising one or more assets, i.e., a prescribed asset or an arbitrary ensemble of assets.

Process 600 starts at step 602 at which a request is received for a desired arbitrary view of a scene that does not already exist and is different from any other existing available views of the scene. Generally, an arbitrary view may comprise any desired view of a scene or asset whose specification is not known in advance prior to being requested. The arbitrary view request of step 602 may be received from a client and comprise specifications of prescribed camera characteristics (e.g., lens type and pose/perspective), lighting, textures, asset ensemble, etc.

At step 604, the arbitrary view of the scene requested at step 602 is generated or rendered based on available resources. For example, the requested arbitrary view generated at step 604 may be appropriately scaled based on the computational or processing capabilities of a client requesting the arbitrary view, a server generating the requested arbitrary view, and/or the bandwidth availabilities of one or more associated communication networks between the client and the server. More specifically, step 604 facilitates resource adaptive rendering by trading-off image quality for responsiveness by scaling or tuning along one or more associated axes which are described next.

A quality of an image comprising a requested view that is generated or rendered at step 604 using the disclosed techniques may at least in part be based on a number of existing perspective-transformed reference images used to generate the requested view. In many cases, employing more references images results in a higher quality and employing fewer reference images results in a lower quality. Thus, the number of reference images having different perspectives that are used to generate a requested view may be adapted or optimized for various platforms, devices, applications, or use cases and may additionally be adapted based on real time resource availabilities and constraints. As a few examples, a relatively higher number of reference images (e.g., 60 images) may be employed to generate a requested view that comprises a still image or that is for a native application on a desktop having a high-speed internet connection while a relatively fewer number of reference images (e.g., 12 images) may be employed to generate a requested view that comprises a frame of a video or augmented reality sequence or that is for a web application for a mobile device.

A quality of an image comprising a requested view that is generated or rendered at step 604 using the disclosed techniques may at least in part be based on the resolutions (i.e., pixel densities) of images comprising one or more assets that are employed to generate the requested view, i.e., images comprising reference perspectives of the one or more assets as well as associated metadata. Higher resolution versions of images comprising an asset result in higher quality while lower resolution versions of images comprising an asset result in lower quality. Thus, the resolutions or pixel densities of images comprising different perspectives and associated metadata that are used to generate a requested view may be adapted or optimized for various platforms, devices, applications, or use cases and may additionally be adapted based on real time resource availabilities and constraints. As a few examples, relatively higher resolution (e.g., 2K×2K) versions of images associated with one or more assets may be employed to generate a requested view that is for a native application on a desktop having a high-speed internet connection while relatively lower resolution (e.g., 512×512) versions of images associated with the one or more assets may be employed to generate a requested view that is for a web based application for a mobile device.

A quality of an image comprising a requested view that is generated or rendered at step 604 using the disclosed techniques may at least in part be based on the bit depths (i.e., bits per pixel) of images comprising one or more assets that are employed to generate the requested view, i.e., images comprising reference perspectives of the one or more assets as well as associated metadata. Higher bit depth versions of images comprising an asset result in higher quality while lower bit depth versions of images comprising the asset result in lower quality. Thus, the precisions of pixels of images comprising different perspectives and associated metadata that are used to generate a requested view may be adapted or optimized for various platforms, devices, applications, or use cases and may additionally be adapted based on real time resource availabilities and constraints. As a few examples, higher precision versions of images associated with one or more assets (e.g., 64 bpp for texture values, float for xyz coordinates and normal vectors) may be employed to generate a requested view that is of higher quality while lower precision versions of images associated with the one or more assets (e.g., 24 bpp for texture values, 48 bpp for xyz coordinates and normal vectors) may be employed to generate a requested view that is of lower quality.

The disclosed techniques for resource adaptive rendering support discrete and/or continuous scaling along any one or more of three axes—number, resolution, and bit depth—of images used to generate or render a requested arbitrary view of a scene. An image quality of a requested view may be varied by appropriately scaling and/or selecting different combinations or versions of images comprising reference views and metadata that are used to generate or render the requested view. An output image quality of the requested view may be selected at step 604 based on one or more (real time) considerations and/or constraints. For example, an image quality selected for a requested view may be based on a platform or device type of the requesting client (e.g., mobile versus desktop and/or models thereof), use case such as on a web page having a prescribed viewport size and/or fill factor (e.g., 512×512 window versus 4K window), application type (e.g., still images versus frames of a video, gaming, or virtual/augmented reality sequence), network connection type (e.g., mobile versus broadband), etc. Thus, a quality may be selected based on a prescribed use case as well as a client's capability with respect to the prescribed use case.

In some embodiments, the disclosed techniques furthermore support streaming or progressive delivery of quality from low to high up to the maximum quality available or feasible at a client device. In many cases, the scaling or selection of number of reference images to use to generate a requested view depends at least in part on latency requirements of an associated application. For example, a relatively larger number of reference images may be employed to generate a still image, but a relatively fewer number of reference images may be employed to generate a frame for applications in which views are rapidly changing. In various embodiments, scaling may be the same or different across one or more of the aforementioned axes available for scaling and/or depending on the type of information encoded by various images. For example, the resolution and the bit depth of the images used to generate a requested view may be scaled uniformly in a directly proportional manner or independently. As one example, resolution may be downsampled but bit depth may be not scaled down at all to preserve high dynamic range and color depth in applications in which maintaining tonal quality (lighting, color, contrast) is important. Moreover, the resolution and the bit depth of the images used to generate a requested view may be scaled differently depending on the type of information encoded in the images since loss may be acceptable for some types of data such as actual pixel values of reference views but may not be acceptable for other types of data including metadata such as depth (xyz coordinates) and surface normal vectors.

At step 606, the requested view generated or rendered at step 604 is provided, e.g., to the requesting client, to fulfill the received request of step 602. Process 600 subsequently ends.

As described, the aforementioned two-dimensional framework for generating or rendering desired arbitrary views of a scene comprising an asset or asset ensemble is based on images comprising reference views having different perspectives as well as metadata associated with each reference view or perspective. As a few examples, metadata associated with each reference view or perspective may associate each pixel of the reference view or perspective to its location (xyz coordinate values) in three-dimensional space as well as surface normal vectors at its location. For images generated via physically based rendering techniques using three-dimensional models, relevant metadata may be captured or generated from the corresponding three-dimensional models and associated with the images. For images (e.g., photographs/scans or other renderings) for which one or more types of metadata are unknown, such metadata values may be determined using machine learning based techniques. For example, neural networks may be employed to determine mappings from image space to metadata space, as further described next.

Figure 7:
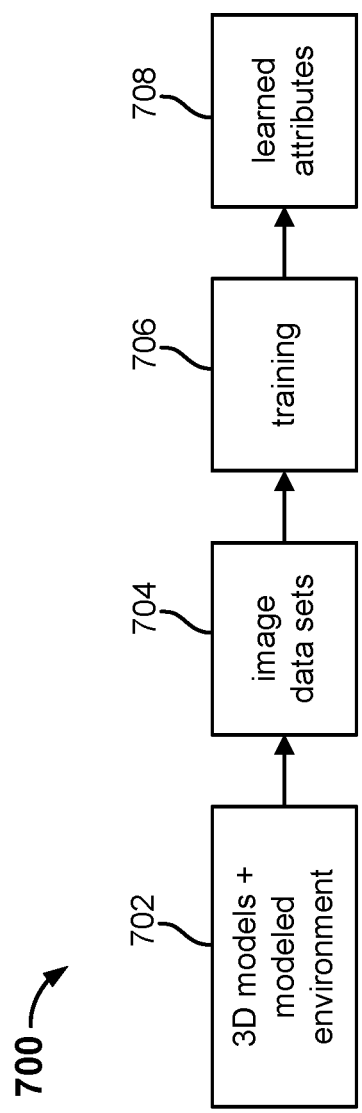
FIG. 7 is a high level block diagram of an embodiment of a machine learning based image processing framework for learning attributes associated with image data sets.

FIG. 7 is a high level block diagram of an embodiment of a machine learning based image processing framework 700 for learning attributes associated with image data sets. Available three-dimensional (polygon mesh) models of assets as well as a prescribed modeled environment 702 are employed to render extensive image data sets 704, for example, using physically based rendering techniques. In some embodiments, the modeled environment closely matches or substantially simulates an actual physical environment in which physical assets are imaged or photographed. The rendered image data sets 704 may comprise photorealistic renderings and may include a plurality of views or perspectives of assets as well as textures. Moreover, the rendered image data sets 704 are appropriately labeled or tagged or otherwise associated with relevant metadata determined and/or captured during rendering.

Extensive, tagged data sets 704 are perfectly qualified for artificial intelligence based learning. Training 706 on data sets 704, for example, using any combination of one or more appropriate machine learning techniques such as deep neural networks and convolutional neural networks, results in a set of one or more properties or attributes 708 associated with data sets 704 to be learned, such as associated metadata values. Such learned attributes may be derived or inferred from labels, tags, or metadata associated with data sets 704. Image processing framework 700 may be trained with respect to a plurality of different training data sets associated with various assets and asset combinations. In some embodiments, however, at least some of the training data sets are constrained to a prescribed modeled environment. After training on large sets of data to learn various attributes or types of attributes, image processing framework 700 may subsequently be employed to detect or derive similar attributes or combinations thereof in other images for which such attributes are unknown, including other renderings of assets that are rendered with respect to the same or a similar model environment as the training data as well as photographs captured in an actual physical environment that matches or is similar to the environment modeled by the model environment of the training data. As one example, a machine learning based framework trained on data sets tagged with image pixels to physical xyz location coordinates and image pixels to surface normal vectors may be employed to predict location (or, equivalently, depth, i.e., the xyz distance from a camera) and surface normal vectors of images for which such metadata values are not known.

The disclosed framework is particularly useful when a controlled or constrained physical environment that is known and can be simulated or modeled is employed to image or photograph individual assets or combinations thereof. In an example application, for instance, a prescribed apparatus for imaging or photographing objects or items (e.g., a camera rig) may be employed in a product warehouse of a retailer. In such an application, precise information about the actual physical environment in which objects are imaged or photographed is known, e.g., in some cases, from the viewpoint or perspective of the imaged objects from within the imaging apparatus. Known information about the actual physical environment may include, for instance, the structure and geometry of the imaging apparatus; the number, types, and poses of cameras used; position and intensity of light sources and ambient lighting; etc. Such known information about the actual physical environment is used to specify the modeled environment of the renderings of the training data sets of the machine learning based image processing framework so that the modeled environment is identical to or at least substantially replicates or simulates the actual physical environment. In some embodiments, for example, the modeled environment comprises a three-dimensional model of the imaging apparatus as well as the same camera configurations and lighting as in the actual physical environment. Metadata values are learned from training data sets tagged with known metadata values so that the disclosed machine learning based framework can then be employed to detect or predict metadata values for imagery for which such metadata values are not known, such as photographs captured in the actual physical environment. Constraining certain attributes of the environment (e.g., geometry, camera, lighting) to known values facilitates learning and being able to predict other attributes (e.g., depth/location, surface normal vectors).

As described, a machine learning based image processing framework may be employed to learn metadata from renders for which metadata values are known and that are generated from available three-dimensional models and a prescribed modeled environment, and the machine learning based image processing framework may subsequently be employed to identify metadata values in images for which such metadata values are not known. Although described with respect to a prescribed physical and corresponding modeled environment in some of the given examples, the disclosed techniques may generally be employed and adapted to learn and predict different types of image metadata for different types of assets, model environments, and/or combinations thereof. For example, the described machine learning based framework may be trained to determine unknown metadata values for images of any assets that are rendered or captured in any environment given that the training data sets span sufficiently exhaustive and diverse assets and environments.

Figure 8:
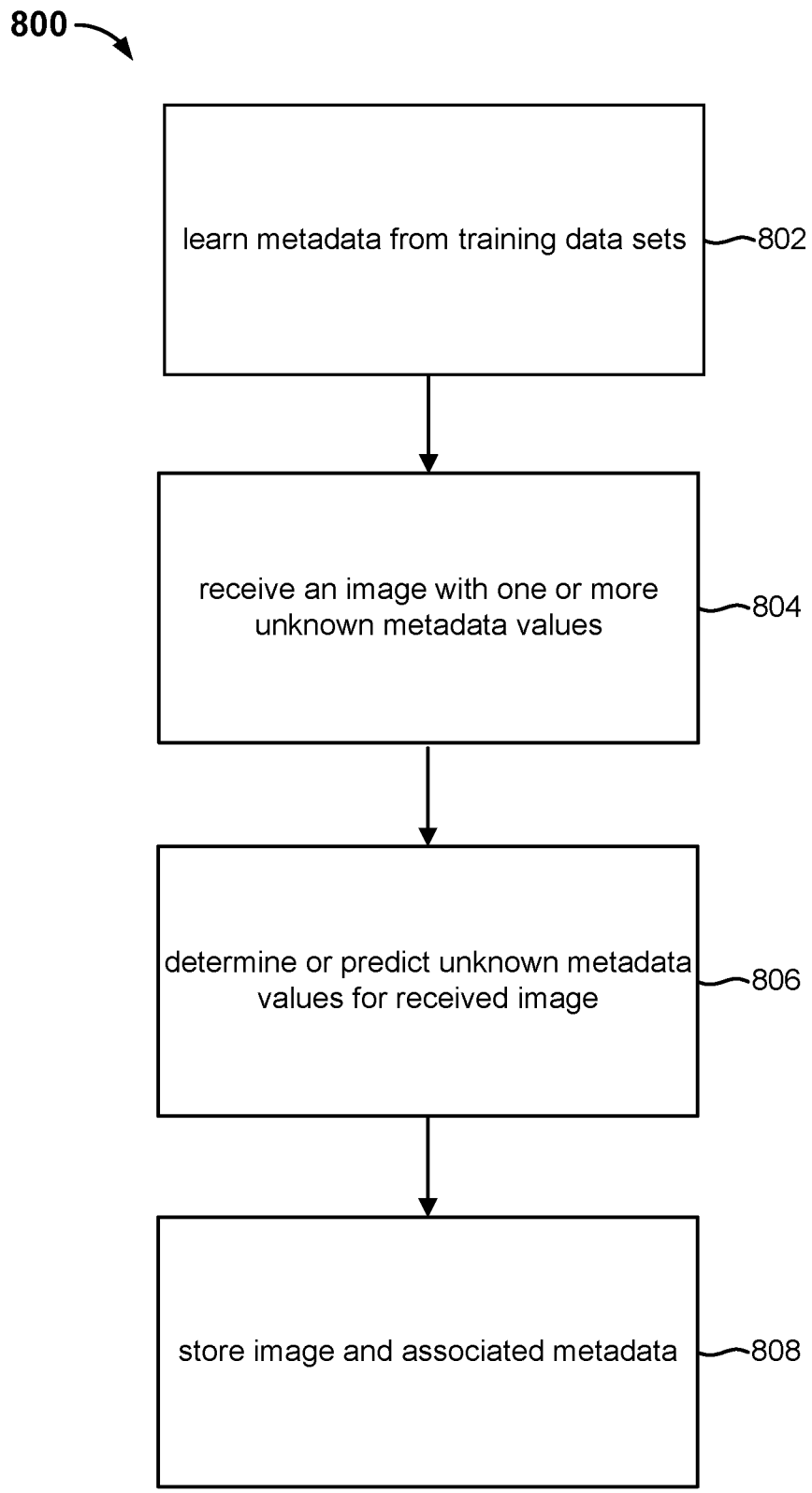
FIG. 8 is a flow chart illustrating an embodiment of a process for populating a database with an image associated with an asset that can be used to generate other arbitrary views of the asset.

FIG. 8 is a flow chart illustrating an embodiment of a process for populating a database with an image associated with an asset or scene that can be used to generate other arbitrary views of the asset or scene. For example, process 800 of FIG. 8 may be employed to populate assets database 106 of FIG. 1. Process 800 employs a machine learning based framework such as framework 700 of FIG. 7. In some embodiments, images of process 800 are constrained to a prescribed physical and corresponding modeled environment. However, more generally, process 800 may be employed with respect to any physical or modeled environment(s).

Process 800 starts at step 802 at which metadata associated with training data sets is learned using machine learning based techniques. In some embodiments, an image data set used for training comprises an extensive collection of images of an asset or scene rendered from a known three-dimensional model of the asset or scene in a simulated or modeled environment defined by prescribed specifications, e.g., of geometry, cameras, lighting, etc. The learned metadata may comprise different types of image metadata values. The training data sets of step 802 may cover different assets in a prescribed model environment or, more generally, may exhaustively cover different assets in different environments.

At step 804, an image is received for which one or more image metadata values are unknown or incomplete. The received image may comprise a rendering or a photograph or scan. In some embodiments, the received image is generated or captured with respect to a modeled or physical environment that is the same as or similar to the rendering environment used for at least some of the training image data sets of step 802.

At step 806, unknown or incomplete metadata values of the received image are determined or predicted using the machine learning based framework of process 800. At step 808, the received image and associated metadata are stored, e.g., in assets database 106 of FIG. 1. Process 800 subsequently ends.

By determining and associating relevant metadata with an image (i.e., the image received at step 804 and stored at step 808), process 800 effectively facilitates transforming the image into a reference image or view of an associated asset or scene that can later be used to generate other arbitrary views of the associated asset or scene. In various embodiments, when storing the image as a reference image, the image may be appropriately tagged with corresponding metadata and/or associated with one or more images that encode associated metadata values. Process 800 may generally be employed to transform any image into a reference image by using machine learning based techniques to determine unknown image metadata values that are needed for an image to be a reference image from which other views of an associated asset or scene, e.g., having arbitrary camera characteristics, textures, lighting, etc., may be generated. Moreover, process 800 is particularly useful for determining or predicting types of metadata for which accuracy is important, such as depth and normal vectors values.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an image for which one or more attributes are unknown, wherein the image comprises a prescribed environment; and
determining one or more unknown attributes for the received image using a machine learning based framework, wherein the machine learning based framework is at least in part trained on image data sets comprising a model environment that substantially simulates the prescribed environment.

2. The method of claim 1, wherein the received image comprises a rendering and the prescribed environment comprises the model environment.

3. The method of claim 1, wherein the received image comprises a photograph and the prescribed environment comprises an actual physical environment.

4. The method of claim 1, wherein the one or more unknown attributes of the received image determined by the machine learning based framework comprise pixel location in three-dimensional space.

5. The method of claim 1, wherein the one or more unknown attributes of the received image determined by the machine learning based framework comprise pixel xyz coordinates.

6. The method of claim 1, wherein the one or more unknown attributes of the received image determined by the machine learning based framework comprise pixel depth.

7. The method of claim 1, wherein the one or more unknown attributes of the received image determined by the machine learning based framework comprise pixel surface normal vectors.

8. The method of claim 1, wherein the prescribed environment is constrained and known.

9. The method of claim 1, wherein known information about the prescribed environment comprises known structure and geometry of the prescribed environment.

10. The method of claim 1, wherein the prescribed environment comprises an apparatus or rig for photographing objects or items.

11. The method of claim 1, wherein known information about the prescribed environment comprises known camera information.

12. The method of claim 1, wherein known information about the prescribed environment comprises known lighting information.

13. The method of claim 1, wherein the training image data sets comprising the model environment are rendered from available three-dimensional models of corresponding assets.

14. The method of claim 1, wherein the training image data sets comprising the model environment are labeled or otherwise associated with relevant metadata.

15. The method of claim 1, wherein various attributes learned by the machine learning based framework from the training image data sets are derived or inferred from labels or metadata associated with the training image data sets.

16. The method of claim 1, wherein the machine learning based framework comprises one or more neural networks.

17. The method of claim 1, wherein the machine learning based framework comprises one or more convolutional neural networks.

18. The method of claim 1, wherein the received image comprises a still image or a frame of a video sequence.

19. A system, comprising:
a processor configured to:
receive an image for which one or more attributes are unknown, wherein the image comprises a prescribed environment; and
use a machine learning based framework to determine one or more unknown attributes for the received image, wherein the machine learning based framework is at least in part trained on image data sets comprising a model environment that substantially simulates the prescribed environment; and
a memory coupled to the processor and configured to provide the processor with instructions.

20. The system of claim 19, wherein the received image comprises a rendering and the prescribed environment comprises the model environment.

21. The system of claim 19, wherein the received image comprises a photograph and the prescribed environment comprises an actual physical environment.

22. The system of claim 19, wherein the one or more unknown attributes of the received image determined by the machine learning based framework comprise pixel location in three-dimensional space.

23. The system of claim 19, wherein the one or more unknown attributes of the received image determined by the machine learning based framework comprise pixel xyz coordinates.

24. The system of claim 19, wherein the one or more unknown attributes of the received image determined by the machine learning based framework comprise pixel depth.

25. The system of claim 19, wherein the one or more unknown attributes of the received image determined by the machine learning based framework comprise pixel surface normal vectors.

26. The system of claim 19, wherein the prescribed environment is constrained and known.

27. The system of claim 19, wherein known information about the prescribed environment comprises known structure and geometry of the prescribed environment.

28. The system of claim 19, wherein the prescribed environment comprises an apparatus or rig for photographing objects or items.

29. The system of claim 19, wherein known information about the prescribed environment comprises known camera information.

30. The system of claim 19, wherein known information about the prescribed environment comprises known lighting information.

31. The system of claim 19, wherein the training image data sets comprising the model environment are rendered from available three-dimensional models of corresponding assets.

32. The system of claim 19, wherein the training image data sets comprising the model environment are labeled or otherwise associated with relevant metadata.

33. The system of claim 19, wherein various attributes learned by the machine learning based framework from the training image data sets are derived or inferred from labels or metadata associated with the training image data sets.

34. The system of claim 19, wherein the machine learning based framework comprises one or more neural networks.

35. The system of claim 19, wherein the machine learning based framework comprises one or more convolutional neural networks.

36. The system of claim 19, wherein the received image comprises a still image or a frame of a video sequence.

37. A computer program product, the computer program product being embodied in a non-transitory computer readable medium and comprising computer instructions which when executed cause a computer to:
receive an image for which one or more attributes are unknown, wherein the image comprises a prescribed environment; and
determine one or more unknown attributes for the received image using a machine learning based framework, wherein the machine learning based framework is at least in part trained on image data sets comprising a model environment that substantially simulates the prescribed environment.

38. The computer program product of claim 37, wherein the received image comprises a rendering and the prescribed environment comprises the model environment.

39. The computer program product of claim 37, wherein the received image comprises a photograph and the prescribed environment comprises an actual physical environment.

40. The computer program product of claim 37, wherein the one or more unknown attributes of the received image determined by the machine learning based framework comprise pixel location in three-dimensional space.

41. The computer program product of claim 37, wherein the one or more unknown attributes of the received image determined by the machine learning based framework comprise pixel xyz coordinates.

42. The computer program product of claim 37, wherein the one or more unknown attributes of the received image determined by the machine learning based framework comprise pixel depth.

43. The computer program product of claim 37, wherein the one or more unknown attributes of the received image determined by the machine learning based framework comprise pixel surface normal vectors.

44. The computer program product of claim 37, wherein the prescribed environment is constrained and known.

45. The computer program product of claim 37, wherein known information about the prescribed environment comprises known structure and geometry of the prescribed environment.

46. The computer program product of claim 37, wherein the prescribed environment comprises an apparatus or rig for photographing objects or items.

47. The computer program product of claim 37, wherein known information about the prescribed environment comprises known camera information.

48. The computer program product of claim 37, wherein known information about the prescribed environment comprises known lighting information.

49. The computer program product of claim 37, wherein the training image data sets comprising the model environment are rendered from available three-dimensional models of corresponding assets.

50. The computer program product of claim 37, wherein the training image data sets comprising the model environment are labeled or otherwise associated with relevant metadata.

51. The computer program product of claim 37, wherein various attributes learned by the machine learning based framework from the training image data sets are derived or inferred from labels or metadata associated with the training image data sets.

52. The computer program product of claim 37, wherein the machine learning based framework comprises one or more neural networks.

53. The computer program product of claim 37, wherein the machine learning based framework comprises one or more convolutional neural networks.

54. The computer program product of claim 37, wherein the received image comprises a still image or a frame of a video sequence.

* * * * *